US010108176B2

(12) United States Patent
Sherbrooke et al.

(10) Patent No.: US 10,108,176 B2
(45) Date of Patent: Oct. 23, 2018

(54) NON-CONCENTRIC MILLING

(71) Applicant: Celeritive Technologies, Inc., Cave Creek, AZ (US)

(72) Inventors: Evan C. Sherbrooke, Moorpark, CA (US); Glenn Coleman, Cave Creek, AZ (US)

(73) Assignee: Celeritive Technologies, Inc., Cave Creek, AZ (US)

( * ) Notice: Subject to any disclaimer, the term of this patent is extended or adjusted under 35 U.S.C. 154(b) by 345 days.

(21) Appl. No.: 14/980,391

(22) Filed: Dec. 28, 2015

(65) Prior Publication Data
US 2016/0187869 A1    Jun. 30, 2016

Related U.S. Application Data

(62) Division of application No. 13/557,990, filed on Jul. 25, 2012.

(60) Provisional application No. 61/511,399, filed on Jul. 25, 2011.

(51) Int. Cl.
*G05B 19/402* (2006.01)
*G05B 19/4093* (2006.01)

(52) U.S. Cl.
CPC ..... *G05B 19/402* (2013.01); *G05B 19/40937* (2013.01); *G05B 2219/37355* (2013.01); *G05B 2219/49372* (2013.01); *G05B 2219/49378* (2013.01); *Y02P 90/265* (2015.11)

(58) Field of Classification Search
CPC combination set(s) only.
See application file for complete search history.

(56) References Cited

U.S. PATENT DOCUMENTS

| 4,569,014 A | 2/1986 | Kishi et al. |
| 4,907,164 A | 3/1990 | Guyder |
| 4,975,856 A | 12/1990 | Vold et al. |
| 5,285,572 A | 2/1994 | Rathi et al. |
| 5,289,383 A | 2/1994 | Sawamura et al. |
| 5,444,636 A | 8/1995 | Yoshida et al. |
| 5,532,933 A | 7/1996 | Nakata |
| 5,662,566 A | 9/1997 | Marxieser et al. |
| 5,710,709 A | 1/1998 | Oliver et al. |
| 5,934,288 A | 8/1999 | Avila et al. |
| 6,004,489 A | 12/1999 | Huang et al. |

(Continued)

FOREIGN PATENT DOCUMENTS

JP    2010003018 A    1/2010

OTHER PUBLICATIONS

U.S. Appl. No. 14/533,050, filed Nov. 4, 2014, Coleman et al.

(Continued)

*Primary Examiner* — Mamadou Diallo
(74) *Attorney, Agent, or Firm* — Perkins Coie LLP

(57) ABSTRACT

Technology for milling selected portions of a workpiece by a cutting tool of a numerical control machine is described. The described technology provides methods and apparatuses for milling areas of a part so that more aggressive machining parameters can be used in the toolpath, thereby resulting in reduced machining time and load. The technology creates a series of toolpath contours where arcs in the toolpath contours are non-concentric with arcs in other toolpath contours. The selected portions of the workpiece are milled by moving the cutting tool in accordance with the toolpath.

12 Claims, 18 Drawing Sheets

(56) References Cited

U.S. PATENT DOCUMENTS

| | | |
|---|---|---|
| 6,266,572 B1 | 7/2001 | Yamazaki et al. |
| 6,311,098 B1 | 10/2001 | Higasayama et al. |
| 6,428,252 B1 | 8/2002 | Oldani |
| 6,438,445 B1 | 8/2002 | Yoshida et al. |
| 6,447,223 B1 | 9/2002 | Farah et al. |
| 6,535,788 B1 | 3/2003 | Yoshida et al. |
| 6,591,158 B1 | 7/2003 | Bieterman et al. |
| 6,678,575 B1 | 1/2004 | Graham et al. |
| 6,745,100 B1 | 6/2004 | Lermuzeaux |
| 6,772,039 B2 | 8/2004 | Kakino et al. |
| 6,823,230 B1 | 11/2004 | Jamalabad et al. |
| 6,824,336 B2 | 11/2004 | Izutsu et al. |
| 6,895,299 B2 | 5/2005 | Red et al. |
| 6,942,436 B2 | 9/2005 | Kakino et al. |
| 6,999,843 B2 | 2/2006 | Matsumoto et al. |
| 7,069,108 B2 | 6/2006 | Saarela et al. |
| 7,070,368 B2 | 7/2006 | Murakami et al. |
| 7,269,471 B2 | 9/2007 | Kadono |
| 7,287,939 B2 | 10/2007 | Koch |
| 7,451,013 B2 | 11/2008 | Coleman et al. |
| 7,577,490 B2 | 8/2009 | Diehl et al. |
| 7,593,786 B2 | 9/2009 | Saarela et al. |
| 7,831,332 B2 | 11/2010 | Diehl |
| 8,265,783 B2 | 9/2012 | Saito |
| 8,295,972 B2 | 10/2012 | Coleman et al. |
| 8,489,224 B2 | 7/2013 | Berman et al. |
| 8,560,113 B2 | 10/2013 | Diehl et al. |
| 8,880,212 B2 | 11/2014 | Coleman et al. |
| 9,489,339 B2 | 11/2016 | Mackman |
| 9,569,868 B2 | 2/2017 | Sud et al. |
| 9,690,282 B2 | 6/2017 | Berman et al. |
| 2001/0048857 A1 | 12/2001 | Koch |
| 2005/0126352 A1* | 6/2005 | Suh .................... G05B 19/4097 82/1.11 |
| 2005/0209730 A1 | 9/2005 | Grund et al. |
| 2005/0234586 A1 | 10/2005 | Agapiou et al. |
| 2005/0246052 A1* | 11/2005 | Coleman .......... G05B 19/40937 700/188 |
| 2005/0251284 A1 | 11/2005 | Balic |
| 2005/0256604 A1 | 11/2005 | Diehi et al. |
| 2006/0167668 A1 | 7/2006 | Cariveau et al. |
| 2006/0291969 A1* | 12/2006 | Koch .................... G05B 19/182 409/132 |
| 2007/0091094 A1 | 4/2007 | Hong et al. |
| 2008/0058982 A1 | 3/2008 | Gray |
| 2008/0107491 A1 | 5/2008 | Osborn |
| 2008/0235641 A1 | 9/2008 | Allen |
| 2008/0269943 A1 | 10/2008 | Diehl et al. |
| 2009/0312993 A1 | 12/2009 | Drumheller et al. |
| 2010/0017762 A1 | 1/2010 | Monkowski et al. |
| 2010/0087949 A1* | 4/2010 | Coleman .......... G05B 19/40937 700/189 |
| 2010/0260569 A1 | 10/2010 | Ham et al. |
| 2010/0274381 A1 | 10/2010 | Gray et al. |
| 2011/0150592 A1* | 6/2011 | Diehl .............. G05B 19/40937 409/80 |
| 2011/0169828 A1 | 7/2011 | Pedersen |
| 2011/0251715 A1* | 10/2011 | Diehl .............. G05B 19/40937 700/191 |
| 2012/0160635 A1 | 6/2012 | Ooe |
| 2012/0290271 A1 | 11/2012 | Diguet |
| 2013/0030562 A1 | 1/2013 | Sherbrooke et al. |
| 2013/0144426 A1 | 6/2013 | Coleman et al. |
| 2013/0297064 A1 | 11/2013 | Sherbrooke et al. |
| 2014/0297021 A1 | 10/2014 | Aggarwal et al. |
| 2016/0187869 A1 | 6/2016 | Sherbrooke et al. |

OTHER PUBLICATIONS

"Adaptive Clearing: The missing strategy for ; roughing," <www.freesteel.co.uk>, 2 pages, May 7, 2000.

Asakawa et al."Automation of Chamfering by an Industrial Robot for the Case of Hole on a Free Cured Surface" Journal of Robotics and Computer-Integrated Manufacturing, Oct. 2002, 7 pages.

Brandt, et al., "Continuous Skeleton Computation by Voronoi Diagram," CVGIP: Image Understanding, May 1992, pp. 329-338, vol. 55, No. 3.

Choy, et al., "A corner-looping based tool path for pocket milling," Computer-Aided Design, Feb. 2003, pp. 155-166, vol. 35, No. 2.

Elber, et al., "MATHSM: Medial Axis Transform toward High Speed Machining of Pockets," Dec. 31, 2003, 16 pages.

Held, et al., "A smooth spiral tool path for high speed machining of 2D pockets" Computer-Aided Design, Jul. 2009, pp. 539-550, vol. 41, No. 7.

Held, M., "Pocket machining based on contour-parallel tool paths generated by means of proximity maps," Computer-Aided Design, Mar. 1994, pp. 189-203, ; vol. 26, No. 3.

Held, M., "Appendix A, Bibliography," On the Computational Geometry of Pocket Machining, 1991, pp. 147-180, Springer-Verlag, Germany.

Held, M., "Chapter 1: Introduction," On the Computational Geometry of Pocket Machining, 1991, pp. 1-16, Springer-Verlag, Germany.

Held, M., "Chapter 10: Generating the Tool Path," On the Computational Geometry of Pocket Machining, 1991, pp. 139-146, Springer-Verlag, Germany.

Held, M., "Chapter 2: Survey of Contour-parallel Milling," On the Computational Geometry of Pocket Machining, 1991, pp. 17-36, Springer-Verlag, Germany.

Held, M., "Chapter 3: Survey of Direction-parallel Milling," On the ; Computational Geometry of Pocket Machining, 1991, pp. 37-52, Springer-Verlag, Germany.

Held, M., "Chapter 4: Preliminaries," On the Computational Geometry of Pocket Machining, 1991, pp. 53-60, Springer-Verlag, Germany.

Held, M., "Chapter 5: Computing Voronoi Diagrams," On the Computational Geometry of Pocket Machining, 1991, pp. 61-88, Springer-Verlag, Germany.

Held, M., "Chapter 6: Implementation Issues," On the Computational Geometry of Pocket Machining, 1991, pp. 89-101, Springer-Verlag, Germany.

Held, M., "Chapter 7: The Concept of Monotonous," On the Computational Geometry of Pocket Machining, 1991, pp. 103-114, Springer-Verlag, Germany.

Held, M., "Chapter 8: Generating the Tool Path," On the Computational Geometry of Pocket Machining, 1991, pp. 115-126, Springer-Verlag, Germany.

Held, M., "Chapter 9: Constructing the Mesh," On the Computational Geometry of Pocket Machining, 1991, pp. 127-137, Springer-Verlag, Germany.

Held, M., "Foreword, Table of Contents," On the ; Computational Geometry of Pocket Machining, 1991, 10 pages, Springer-Verlag, Germany.

Ibaraki, et al., "Tool Path Planning Using Trochoid Cycles for Hardened Steel in Die and Mold Manufacturing (1st Report), Tool Path Generation for Trochoid Cycles Based on Voronoi Diagram," Advances in Agile Manufacturing—ICAM 2003, 2003, pp. 435-442, China Machine Press.

Jeong et al., "Tool Path Generation for Machining Free-Form Pockets Using Voronoi Diagrams," The International Journal of Advanced Manufacturing Technology, vol. 14, Issue 12, 1998, pp. 876-881.

Kramer, Thomas R., "Pocket Milling with Tool Engagement Detection," cover page and pp. 1-16, Apr. 4, 1991.

Lai et al., "Incremental algorithms for finding the offset distance and minimum passage width in a pocket machining toolpath using Voronoi technique," Journal of Materials Processing Technology, 100, 2000, 6 pages.

Lambregts, et al., "An efficient automatic tool path generator for 2 1/2 D free-form pockets," Computers in Industry, Aug. 1996, pp. 151-157, vol. 29, No. 3.

Persson, H., "NC machining of arbitrarily shaped pockets," Compter-Aided Design, May 1978, pp. 169-174, vol. 10, No. 3.

Salman, et al., "Voronoi diagram-based tool path compensations for removing uncut material in 2 1/2 D pocket machining," Computer-Aided Design, Mar. 2006, pp. 194-209, vol. 38, No. 3.

(56) References Cited

OTHER PUBLICATIONS

Stori, et al., "Constant Engagement Tool Path ; Generation for Convex Geometries," J. Mfg. Systems, 19:3, ABI/INFORM Global 2000.

Tsai, et al., "Operation Planning Based on Cutting Process Models," Annals of the CIRP, 1991, pp. 95-98, vol. No. 1.

Vona, et al., "Voronoi toolpaths for PCB mechanical etch: Simple and intuitive algorithms with the 3D GPU," Proceedings of the 2005 IEEE International Conference on Volume, Apr. 2005, 8 pages.

Wang, et al., "A Metric-Based Approach to 2D Tool-Patah Optimization for High-Speed Machining," 9 pages.

Yamaji, et al., "Tool Path Planning Using Trochoid Cycles for Hardened Steel in Die and Mold Manufacturing (2nd Report), Tool Path Planning to Avoid an Excessive Tool Load," Advances in Agile Manufacturing—ICAM 2003, 2003, pp. 443-450, China Machine Press.

Yao, Z., "A Novel Cutter Path Planning Approach to High Speed Machining," Computer-Aided Design & Applications, 2006, pp. 241-248, vol. 3, Nos. 1-4.

Klocke et al., "Integrated Approach for Knowledge-Based Process Layout for Simultaneous 5-Axis Milling of Advanced Materials," Hindawi Publishing Corporation, vol. 52, No. 2, Jan. 1, 2011, 7 pages.

Li et al., entitled "Tool Path Generation for Triangular Meshes Using Least-Squares Conformal Map," Taylor and Francis, International Journal of Production Research, vol. 49, No. 12, Jun. 2011, 15 pages.

Sinumerik—Hindawi, "Milling with Sinumerik Mold Making with 3 to 5-axis simultaneous milling," Siemens AG, Feb. 16, 2012, 129 pages.

\* cited by examiner

NON-CONCENTRIC MILLING

CROSS-REFERENCE TO RELATED APPLICATION(S)

This application is a divisional of U.S. patent application Ser. No. 13/557,990, filed on Jul. 25, 2012, entitled "NON-CONCENTRIC MILLING," which claims the benefit of U.S. Provisional Application Ser. No. 61/511,399, filed on Jul. 25, 2011, entitled "NON-CONCENTRIC MILLING," which are hereby incorporated herein in its entireties by reference.

BACKGROUND

Numerically controlled (NC) milling involves various techniques for removing material ("milling" or "cutting") from a workpiece to create an object of a particular shape and with defined dimensions. In NC milling, a milling machine or machine tool generally drives one or more cutting tools along a programmed path, known as a toolpath.

A toolpath is often generated using a computer, typically with the aid of a Computer Aided Manufacturing (CAM) system. Using a CAM system, a programmer can define a volume to be milled by selecting geometry from the graphics display and specifying a set of governing parameters. Although the name and number of these parameters may vary widely among CAM systems, often a programmer will specify a spindle speed, a feedrate, a stepover or radial depth of cut (RDOC), and an axial depth of cut (ADOC).

A common algorithm used in CAM systems is a parallel offset algorithm. In its simplest form, the parallel offset algorithm takes a closed region bounded by a set of boundary contours (e.g., closed loops formed by sequences or chains of curves) and computes a series of inner offset contours at regular distances from the boundary. Commonly, the first offset is a distance R+w from the boundary of the region, where R is the radius of the cutting tool and w is some amount of extra material to leave on the walls of the workpiece. Subsequent offset contours are at distances R+w+s, R+w+2s, etc., where s is the RDOC. These contours become smaller and smaller until nothing is left, at which point the process terminates. Then, a toolpath is generated by traversing these offsets in reverse, cutting the region from inside to out. FIG. 1 shows a simple pocket region, bounded by the boundary contour 102, with simple parallel offsets 104 comprising the prior art toolpath.

Early versions of the parallel offset algorithm created each offset contour by taking each element of the boundary contour and computing an offset curve on one side of the boundary element. By forcing the boundary contour to be expressed as a sequence of circular arcs and line segments, this part of the process is quite simple because the offset of a circular arc is a concentric circular arc of identical sweep angle but different radius, and the offset of a line segment is a line segment parallel to it and of the same length. Unfortunately, after the offset elements are generated in this manner, they may need to be intersected and trimmed against each other to generate the final offset contour. For example, consider the boundary contour 202 in FIG. 2. The intersection of offset elements with each other produces pieces 204 that become part of the offset contour, and pieces 206 that are thrown away. This process may need to be repeated for each offset contour, is typically inefficient, and it suffers from numerical instability that causes computer implementations of it to fail often.

In 1978, Persson developed a method for computing offset curves for NC milling based on bisectors of boundary curves. Held refined this idea in 1991 and developed a stable, efficient method for creating sequences of offsets based on a Voronoi Diagram. The Voronoi Diagram of boundary contours is simply a partitioning of the closed region into a number of areas, called Voronoi faces, each of which is closer to a given boundary element than to any other boundary element. FIG. 3 shows a simple shape partitioned into four Voronoi faces 302, 304, 306, and 308, each of which is associated with a single boundary segment. The edges 310, 312, 314, 316, 318 and vertices 320, 322 of the Voronoi Diagram are the only places inside the region that are equidistant from two or more boundary elements. For this reason, it is customary to define a function on the edges and vertices of the Voronoi Diagram known as the "radius function." For any point on a Voronoi edge or vertex, the radius function returns the distance from that point to the nearest boundary. Persson and Held realized that offset elements always meet other offset elements at these edges and vertices of the Voronoi Diagram. Thus, pre-computing the Voronoi Diagram leads to a simple process for creating offset contours: walking around the Voronoi Diagram, marking points on Voronoi edges that are at the target offset distance using the radius function, and connecting the points together with circular arcs and lines. FIG. 4 illustrates how points 402, 404, 406, and 408 on Voronoi edges are visited in order, so as to trace out the dashed-line offset contour 410. This process is extremely fast and numerically stable, and is widely used in modern CAM systems.

Classic parallel offset milling has a number of problems that can make it unsuitable for high speed milling. It is well known, for example, that tangent discontinuities in the offset contours can cause spikes in tool load and make it difficult for the tool to clear the chips it cuts, leading to a buildup in heat and possibly catastrophic tool failure. Less well known is that the material removal rate can vary considerably even when the offset contours are tangent continuous. Consider FIG. 5, which illustrates what happens when we move the milling cutter from a straight line cut to an arc cut, where the arc cut is concentric with a smaller arc cut on a previous pass. Milling along path 502 has left us with material in regions 504 and 506. During the next pass 508, the cutting tool removes region 506. Note that while the cutter is moving along the linear part of 508, only 58 degrees of the cutter are in contact with region 506. However, when the cutter moves to the arc portion of 508, 72 degrees of the cutter are in contact with region 506. If the feedrate is kept constant, the material removal rate along the arc increases by about 31% over the straight-line cut. Smaller arcs would result in even larger increases in material removal rate.

To address such variations in the material removal rate, many modifications to the classic offset algorithm have been proposed, including toolpath smoothing, feedrate optimization, and techniques designed to control the tool engagement angle or material removal rate. Many of these approaches require additional tool motion; in some cases, the total travel distance of the tool can be up to 200% longer than a simple parallel-offset path. Although the tool may be able to travel at a significantly higher feedrate, limitations of the milling machine, cutting tool, or material can make such an increase in travel distance impractical.

DETAILED DESCRIPTION

A high performance milling technology is described ("the described technology"). The described technology provides methods and apparatuses for milling areas of a part so that more aggressive machining parameters can be used in the toolpath then when using conventional techniques, thereby resulting in reduced machining time and load. The described technology creates a series of toolpath contours where arcs in the toolpath contours are non-concentric with arcs in other toolpath contours. The positioning of these arcs effectively reduces the material removal rate, tool load, and chip thickness as the cutting tool moves along them, thereby improving chip clearance, heat dissipation and tool life. Although embodiments of the described technology may increase the length of the toolpath over traditional parallel offset contours, the increase is generally negligible.

Some embodiments of the described technology are described below. However, the described technology can be implemented using other embodiments.

First Embodiment

The first embodiment addresses the problem of milling a portion of a workpiece, preferably bounded by one or more boundary contours expressed as (or approximated by) chains of line segments and circular arcs, forming a tangent-continuous boundary. The workpiece is milled with a milling cutter of radius R, and the RDOC or stepover is set to some value s.

This embodiment performs the steps of (1) computing a Voronoi Diagram from the boundaries of the workpiece; (2) adding one or more branches to the Voronoi Diagram to create a Modified Voronoi Diagram; (3) traversing the Modified Voronoi Diagram to create portions of a toolpath; and (4) outputting instructions based on the toolpath to control the operation of a milling machine.

Figure 4:
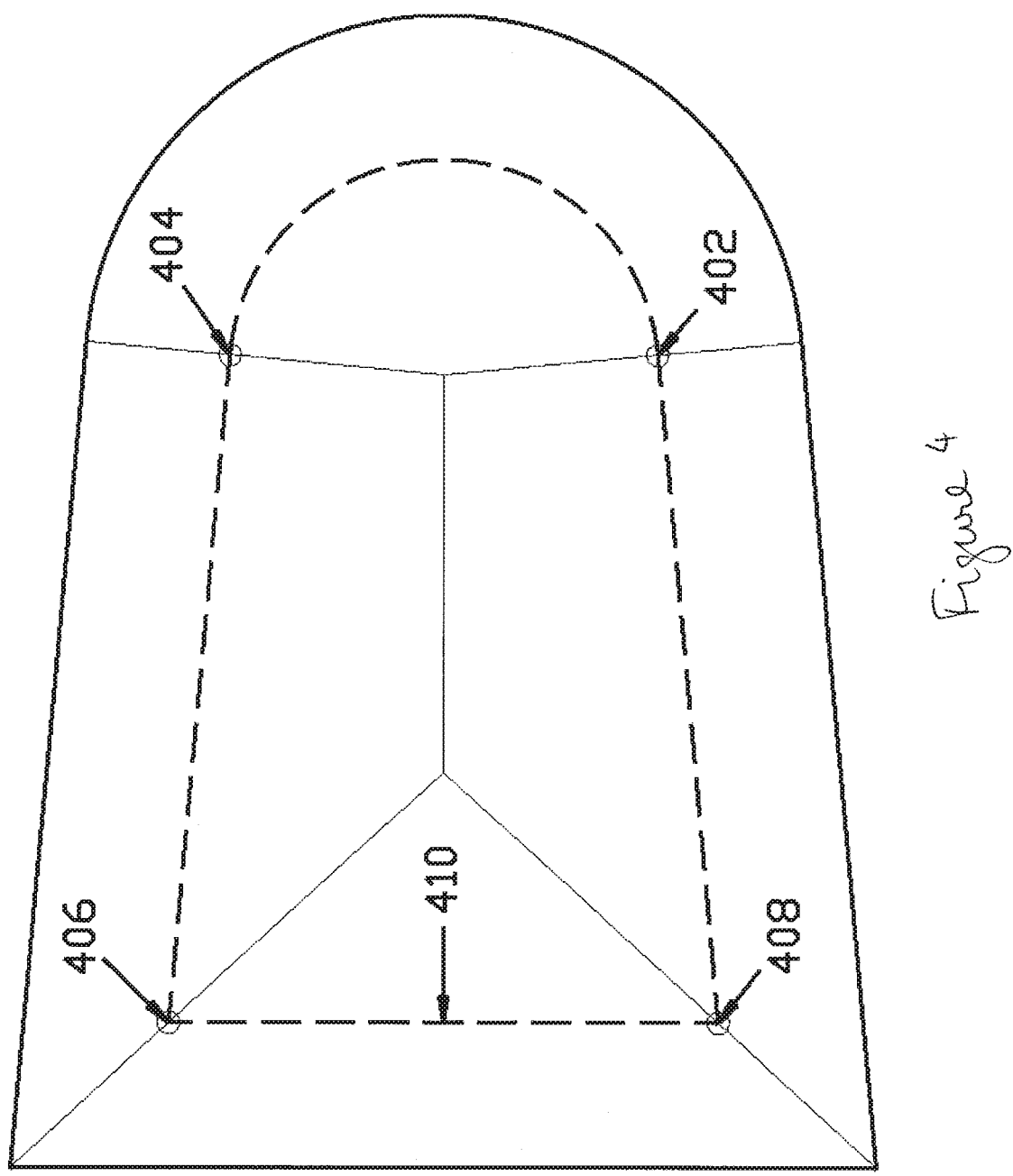
FIG. 4 is a plan-view diagram illustrating the process of creating a single offset contour using the workpiece and Voronoi Diagram from FIG. 3.
Figure 5:
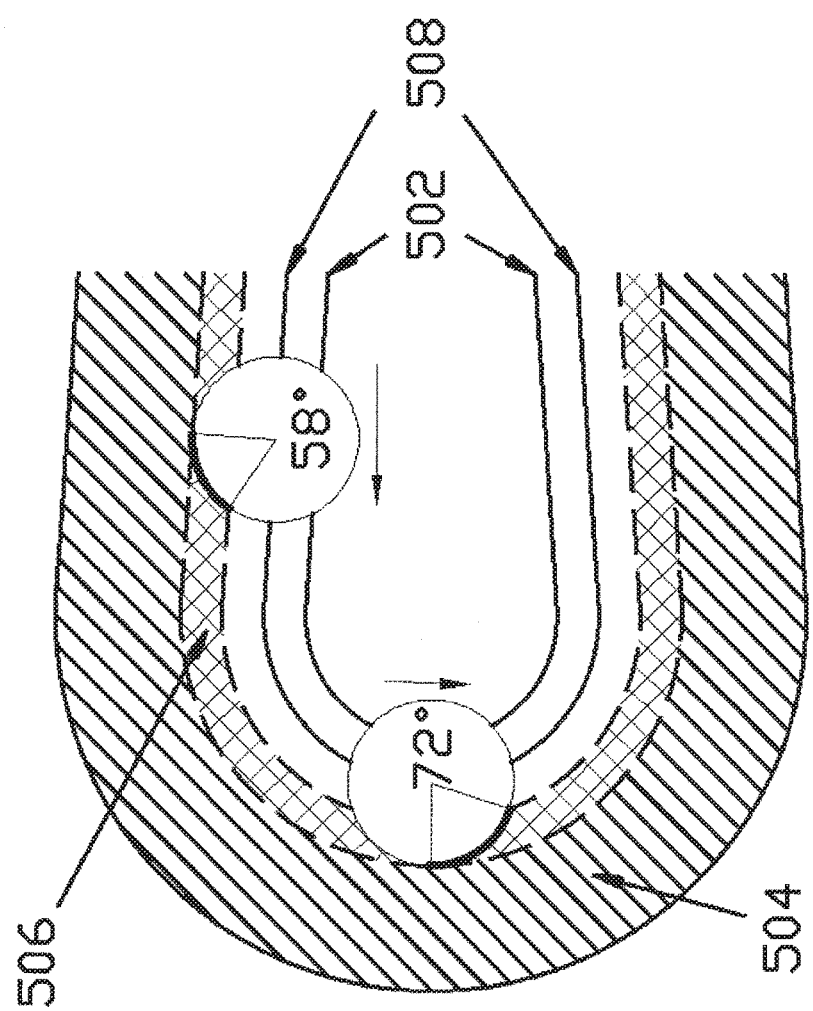
FIG. 5 is a plan-view diagram illustrating a typical increase in cutter engagement angle when moving from linear motion to arc motion in a parallel offset toolpath.
Figure 6:
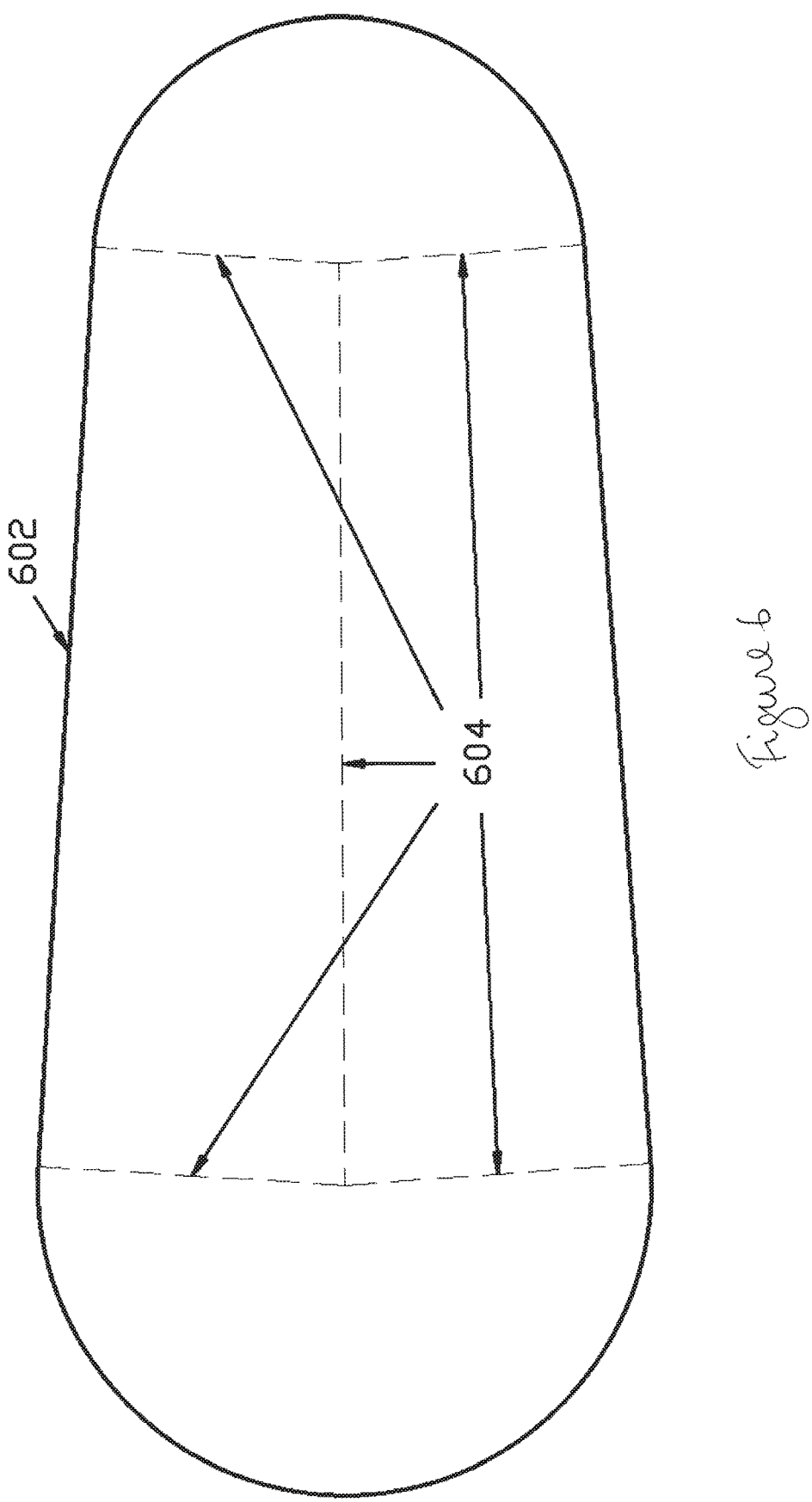
FIG. 6 is a plan-view diagram illustrating a simple workpiece and its Voronoi Diagram, where the workpiece boundary is tangent continuous everywhere and composed only of line segments and circular arcs.

Consider the simple region illustrated in FIG. 6 bounded by a tangent continuous boundary contour 602. Although only one contour is shown in the figure, this embodiment is applicable to regions bounded by not only an outer contour but any number of tangent continuous inner contours as well. First, compute the Voronoi Diagram 604 of this region. As illustrated in FIG. 4, conventional techniques construct toolpath contours by creating concentric arcs at each end, joined smoothly by line segments tangent to the arcs. However, instead of proceeding as taught in the prior art, the described technology adds new branches to the Voronoi diagram, thus creating a Modified Voronoi Diagram. The procedure can be implemented as follows.

Figure 7:
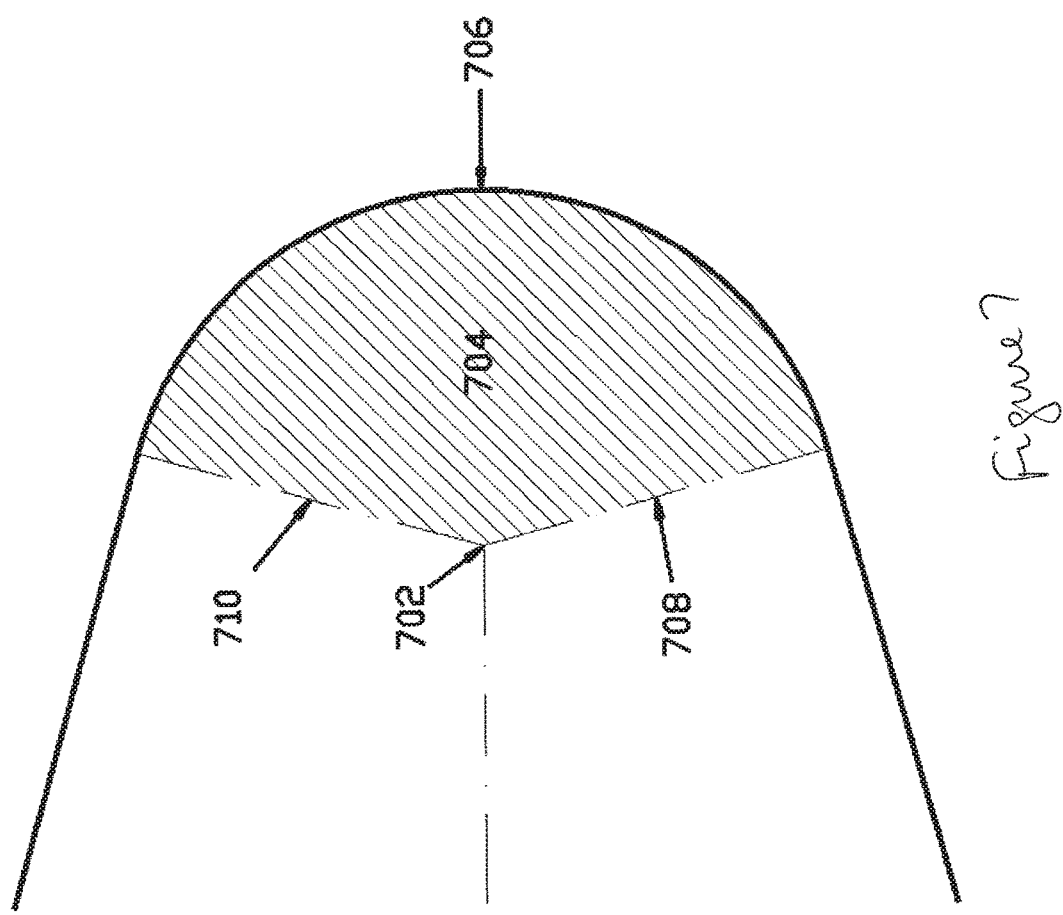
FIG. 7 is a plan-view diagram illustrating a portion of a workpiece and its Voronoi Diagram near a circular arc on the workpiece boundary.

First, scan the Voronoi Diagram for vertices that are branch points (that is, where three or more branches of the Voronoi Diagram meet). For each branch point vertex, examine the faces meeting at that vertex and see if any of them are faces associated with a convex arc on the boundary. Referring to FIG. 7, vertex 702 is one such vertex, and the hashed area 704 is a Voronoi face attached to that vertex and associated with the boundary arc 706.

Figure 8:
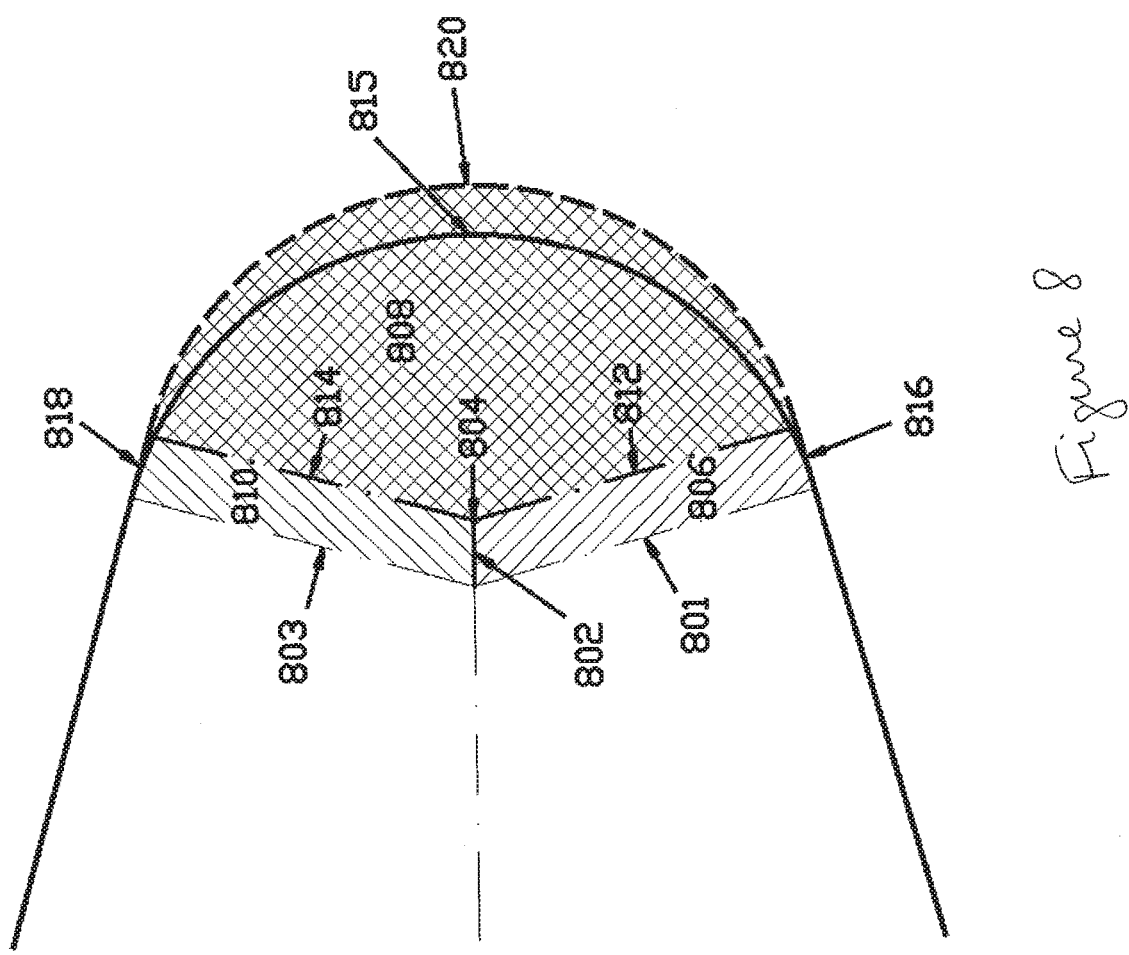
FIG. 8 is a plan-view diagram of the portion of the workpiece of FIG. 7, illustrating the addition of extra branches to the Voronoi Diagram in order to form a Modified Voronoi Diagram.

Let edges 708 and 710 be the two Voronoi edges connected to vertex 702 and bounding the face 704, sorted so that edge 708 precedes edge 710 in a counterclockwise ordering of edges around vertex 702. Referring now to FIG. 8, create a new edge 802, between edges 801 and 803 in the counterclockwise ordering. Preferably, edge 802 will be a bisector between edges 801 and 803, but this is not required. The length of edge 802 is some distance d. Determining a good value for d is described in greater detail below. At the end of this new edge, create a new Voronoi vertex 804, which creates three new faces 806, 808, and 810 (each shown in a different hash pattern) and two new Voronoi edges 812 and 814. Doing so also effectively replaces original boundary arc 815 with three new boundary elements: two line segments 816 and 818 tangent to the original boundary arc, and one arc 820 tangent to these two line segments.

By performing this modification to the Voronoi Diagram for every Voronoi face associated with a convex arc, the process creates a Modified Voronoi Diagram. A toolpath contour may then be created by traversing the Modified Voronoi Diagram using the conventional technique illustrated in FIG. 4 and described above.

The following is a process for computing the length d of a new edge added in the course of modifying the Voronoi Diagram as described above. Preferably, d should be larger for small arc sizes and smaller for large arc sizes. This has the effect of making inner passes closer together than outer passes when convex arcs are created. As a result, the material removal rate for inner cuts will be reduced, whereas in classic concentric arc milling, it might be prohibitively high.

Figure 9:
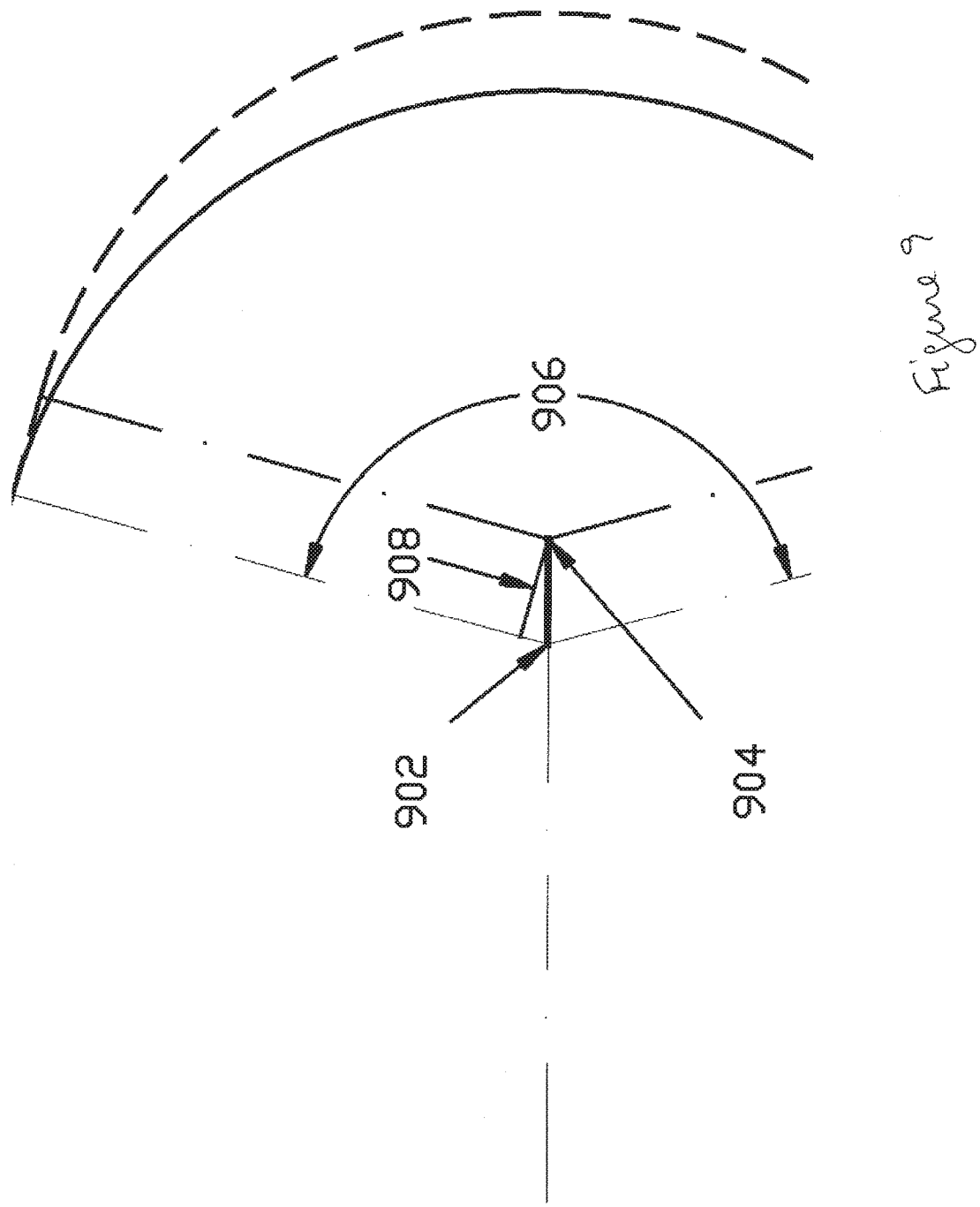
FIG. 9 is a plan-view diagram of the portion of the workpiece of FIG. 8, illustrating the computation of the length of a branch added as part of a Modified Voronoi Diagram.

Suppose we are computing a toolpath contour at offset distance q=R+w+ks for some positive integer k. Referring now to FIG. 9, a close-up of the geometry in FIG. 8, suppose the radius function at 902 is equal to $r_1$, and we are interested in determining the radius function at the new endpoint 904 of the edge we are adding, $r_2$. Let us set a threshold of s/2 as the maximum amount we allow the arc of radius $r_2$ to extend beyond the arc of radius $r_1$. The means that $s/2=d_{max}+r_2-r_1$, where $d_{max}$ is the maximum distance possible between 902 and 904. But if we let A be the sweep angle of the arc 906, and create a right triangle by adding the line segment 908, then we also know that $r_1-r_2=d_{max}\cos A/2$. Adding these two equations gives $d_{max}=s/(2*(1-\cos A/2))$. We also choose to limit $d_{max}$ so that $r_2$ can never be different from $r_1$ by more than s/2, which means that $d_{max}$ is less than or equal to $s/(2 \cos A/2)$. In other words, $d_{max}=\min\{s/[2*(1-\cos A/2)], s/(2 \cos A/2)\}$.

We then compute d from $d_{max}$ by weighting it based on the radius function reduced by the offset distance, $r_1-q$. One approach to do this is to determine a weighting factor so that on the innermost cut, $d=d_{max}$ but on the outermost cut, d=0 (to avoid gouging the workpiece boundary on the final cut). Suppose the final offset contour around 902 has an offset distance equal to $q_{max}$, which is less than $r_1$. Let $f_{max}=1/(r1-q_{max})-1/(r_1-R-w)$. Let $f=1/(r_1-q)-1/(r_1-R-w)$. Then set $d=d_{max}*f/f_{max}$. This process ensures that d=0 on the outermost pass where q=R+w and f=0, but $d=d_{max}$ on the innermost pass where $f=f_{max}$. Note that d decreases as q decreases, and that d will be different for each pass, resulting in non-concentric arcs.

Of course, there are many possible methods for determining d, and it is understood that many other methods could be used without deviating from the described technology. Using an algorithm such as the one above, however, guarantees that no concentric arcs will be created, and the material removal rate and chip thickness will be reduced more for inner cuts than for outer cuts, as desired.

Figure 10:
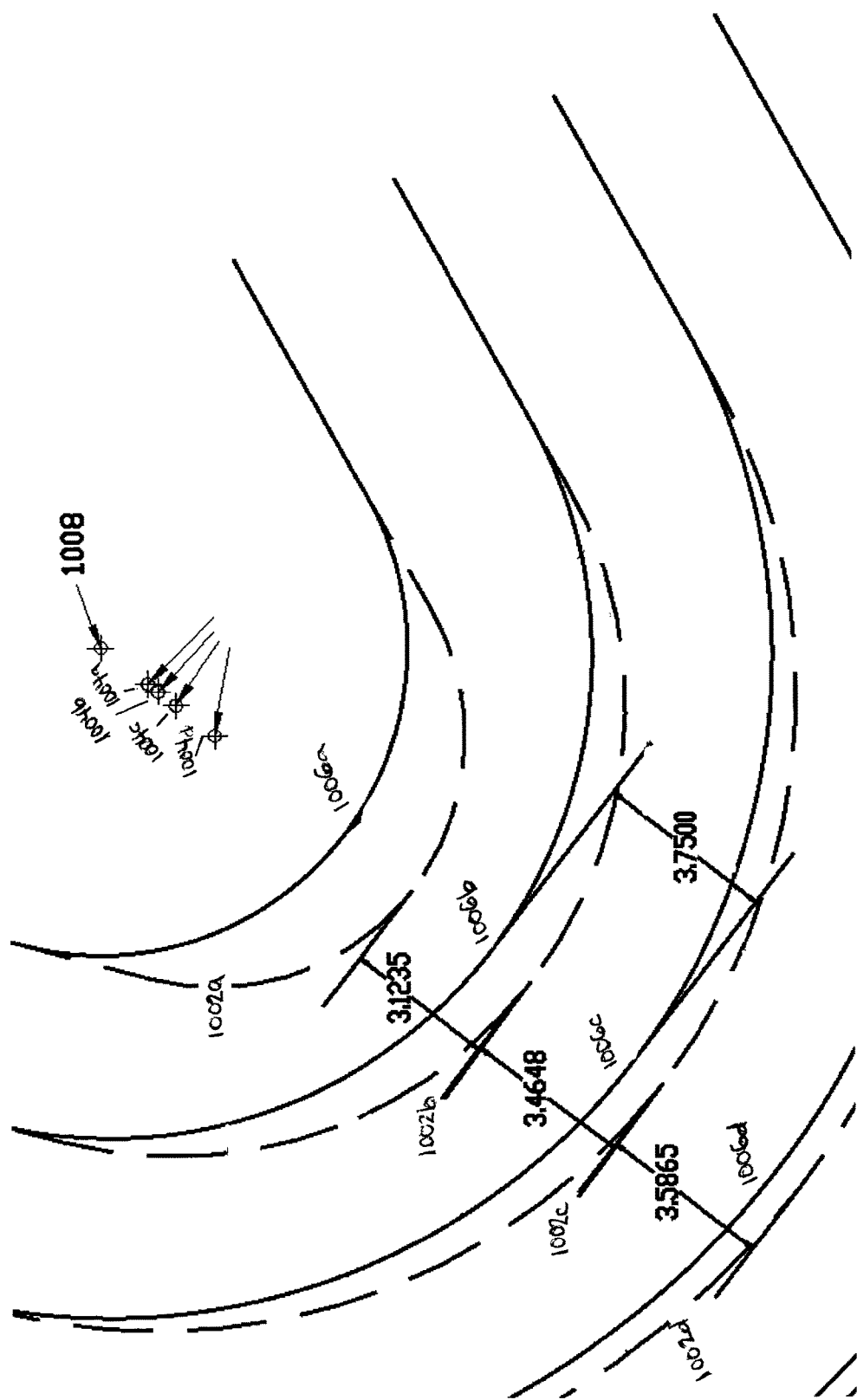
FIG. 10 is a plan-view diagram illustrating differences between a prior art toolpath and an Embodiment of the present described technology.

FIG. 10 illustrates the effect of multiple passes, where d is a different value for each pass. The arcs 1006a-d illustrated using a solid line lie on toolpath contours created by conventional techniques; each arc shares the same center point 1008. In contrast, the curves 1002a-d illustrated using dashed lines are the result of applying the described technology; they consist of sequences of linear segments and circular arcs. Note that the toolpath contours are most different in the inner passes where the arc radii are smaller. As is illustrated in FIG. 10, the spacing between the arcs 1002a-d increases from 3.1235 mm to 3.5865 mm on the first few passes. In contrast, in the prior art toolpath containing the concentric arcs 1006a-d, the spacing is constant at 3.75 mm. The non-concentric centers of the dashed-line arcs 1002 created in the described technology are shown as the different points 1004a-d; in contrast, the center of all the prior-art arcs 1006a-d is at the point 1008.

Figure 11:
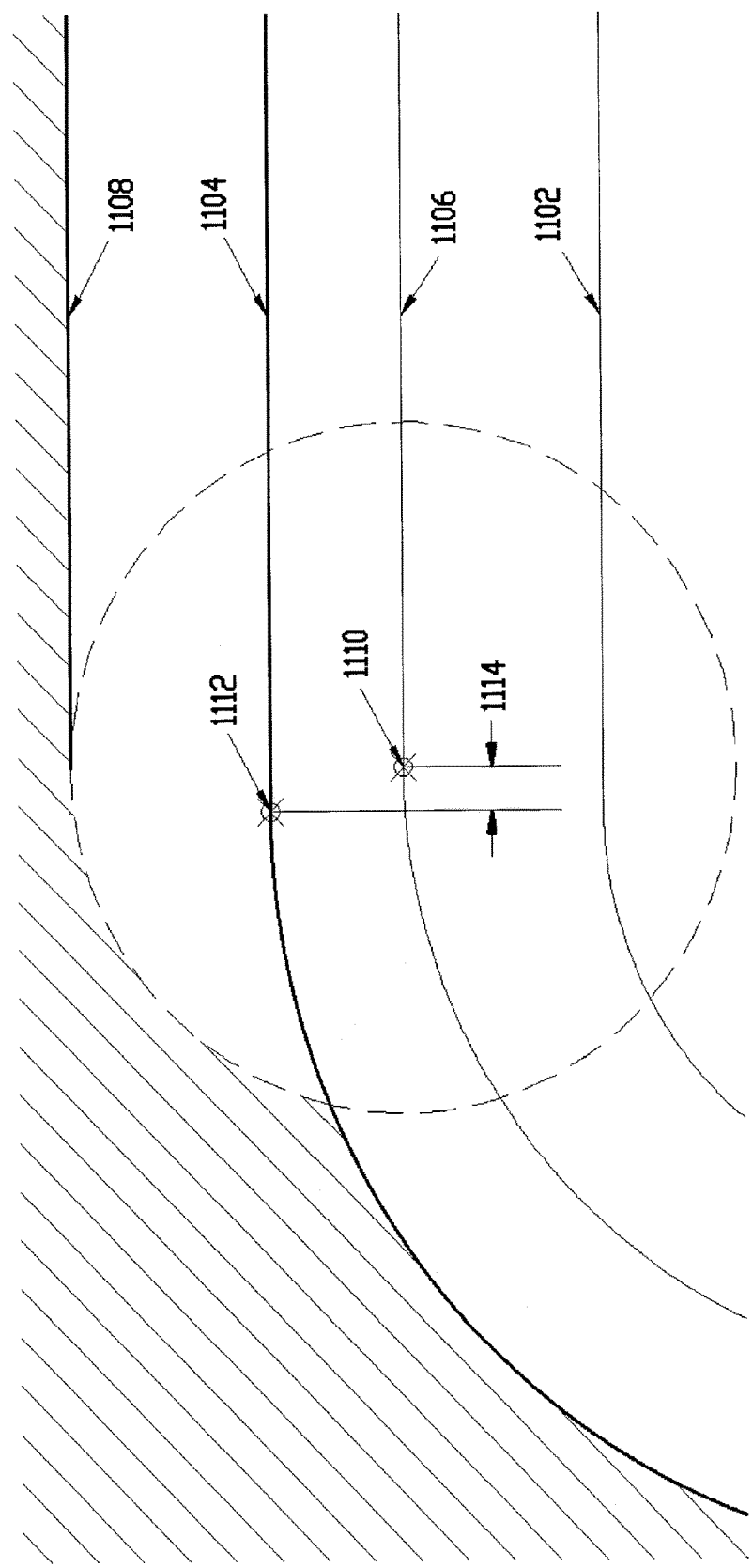
FIG. 11 is a plan-view diagram illustrating an arc move beginning sooner than an arc move on the previous pass.

The reduced spacing between the non-concentric arcs in the described technology lessens the amount of material removed in the arc moves and also reduces the associated tool load. Consequently, as compared to the prior art toolpath, less heat is generated during these arc moves, helping to extend cutting tool life. There is also an additional benefit: FIG. 11 illustrates that a previous tool pass 1102 has left an in-process material boundary 1104. When the tool is on the next pass 1106, it leaves a new in-process material boundary 1108. When using the described technology, the tool begins its arc move on the current pass at point 1110, before it reaches the start of the curved portion of the in-process material boundary shown at 1112. This extra distance 1114 means that not only will the tool load be less (as shown in FIG. 10) but the change in tool load will also be more gradual and spread over a longer distance. This smoother behavior can also extend cutting tool life.

Second Embodiment

The first embodiment described a method for milling a workpiece with boundaries that are everywhere tangent continuous. Consider now a workpiece whose boundaries are not tangent continuous, preferably bounded by one or more boundary contours expressed as (or approximated by) chains of line segments and circular arcs. Preferably, the workpiece is to be milled with a milling cutter of radius R.

In this embodiment, a computing device causes (1) computing of a Voronoi Diagram of a workpiece; (2) trimming away portions of the Voronoi Diagram; (3) adding boundary arcs and new branches to the Voronoi Diagram to define a tangent-continuous subset of the workpiece; (4) adding one or more branches to the Voronoi Diagram to create a Modified Voronoi Diagram; (5) traversing the Modified Voronoi Diagram to create portions of a toolpath; and (6) outputting instructions based on the toolpath to control the operation of a milling machine.

Referring back to FIG. 3, consider the effect of removing all or part of the Voronoi edges 310 and 312. As illustrated in FIG. 4, tangent discontinuities in offset contours may only occur at points similar to 406 and 408: points on Voronoi edges where the tangents to the associated offset elements are not collinear. Therefore, if edges 310 and 312 did not exist or were trimmed so that they lay inside the offset contour 410, then offset contour 410 would be fully tangent continuous.

Figure 1:
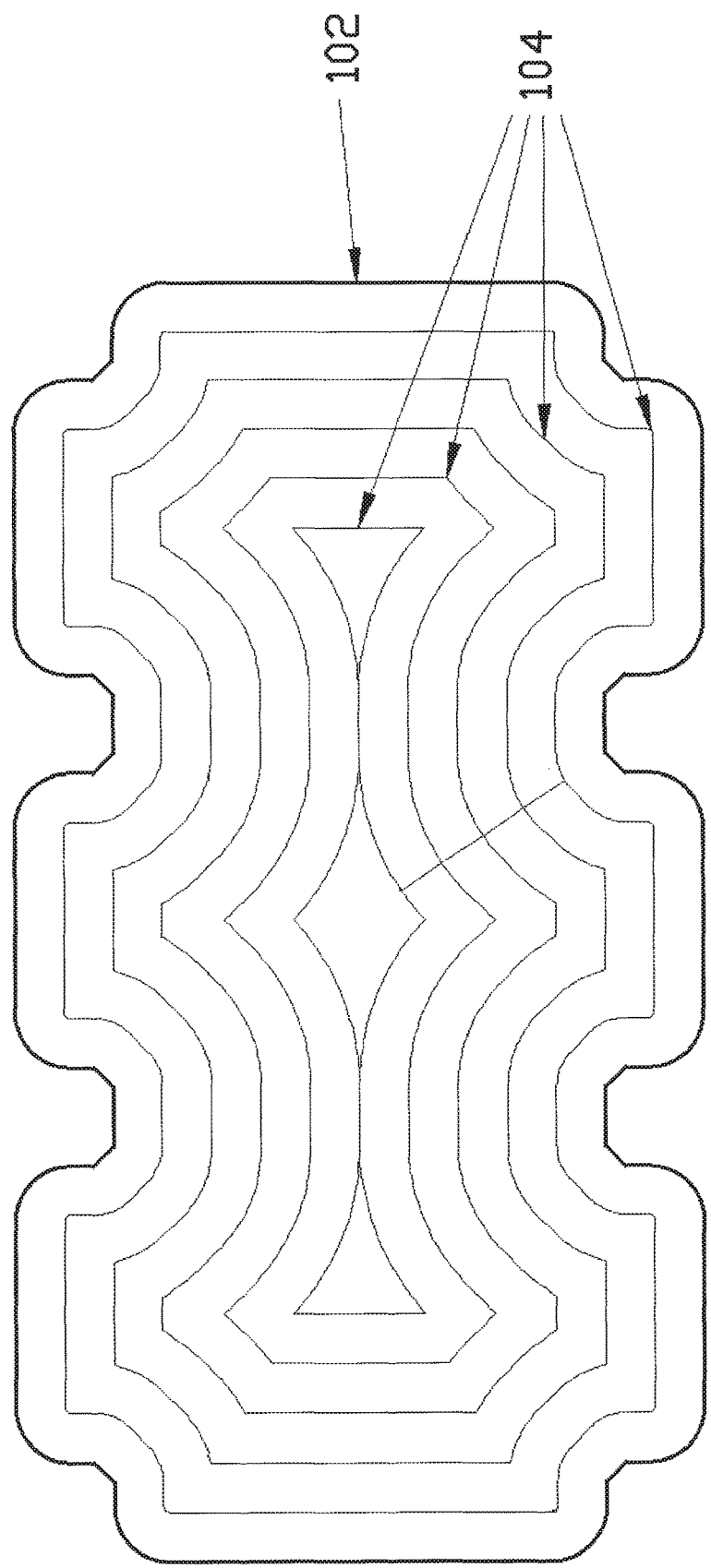
FIG. 1 is a plan-view diagram illustrating a workpiece and a parallel-offset toolpath with multiple passes.
Figure 2:
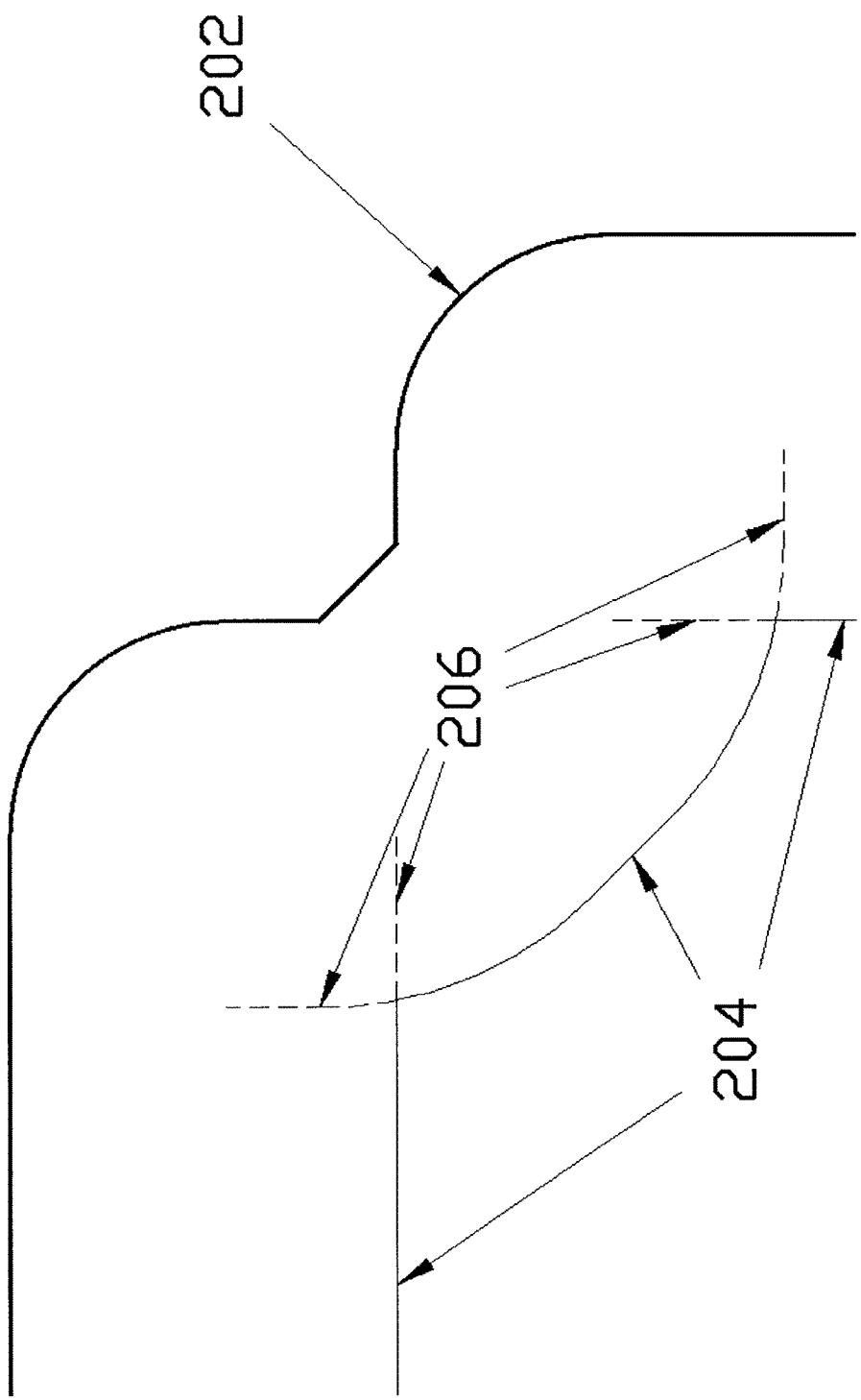
FIG. 2 is a plan-view diagram of the upper-right-hand portion of the workpiece of FIG. 1, illustrating the process of offsetting individual boundary elements of the workpiece and trimming the offsets at intersection points.
Figure 3:
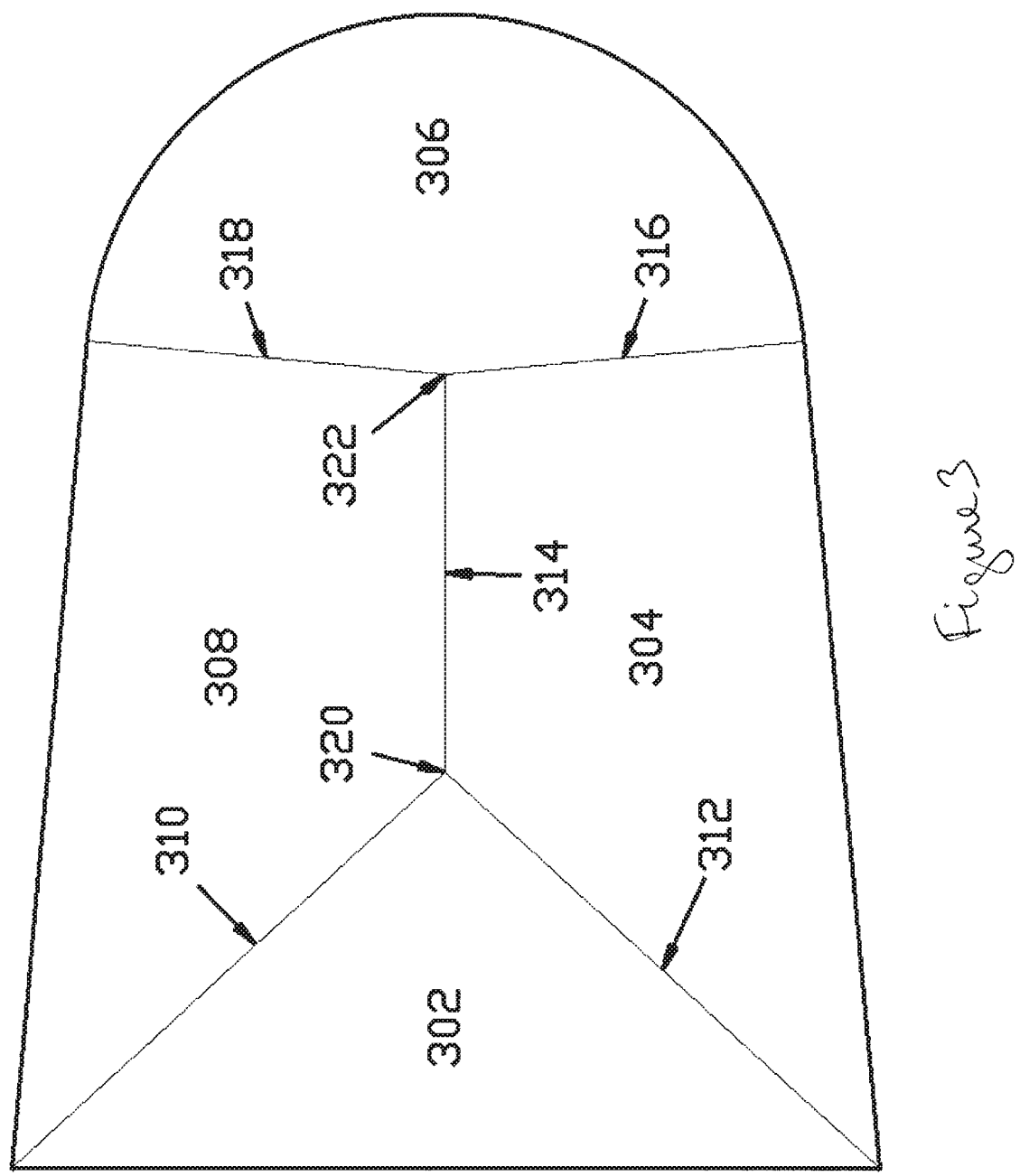
FIG. 3 is a plan-view diagram illustrating a simple workpiece and its Voronoi Diagram.
Figure 12:
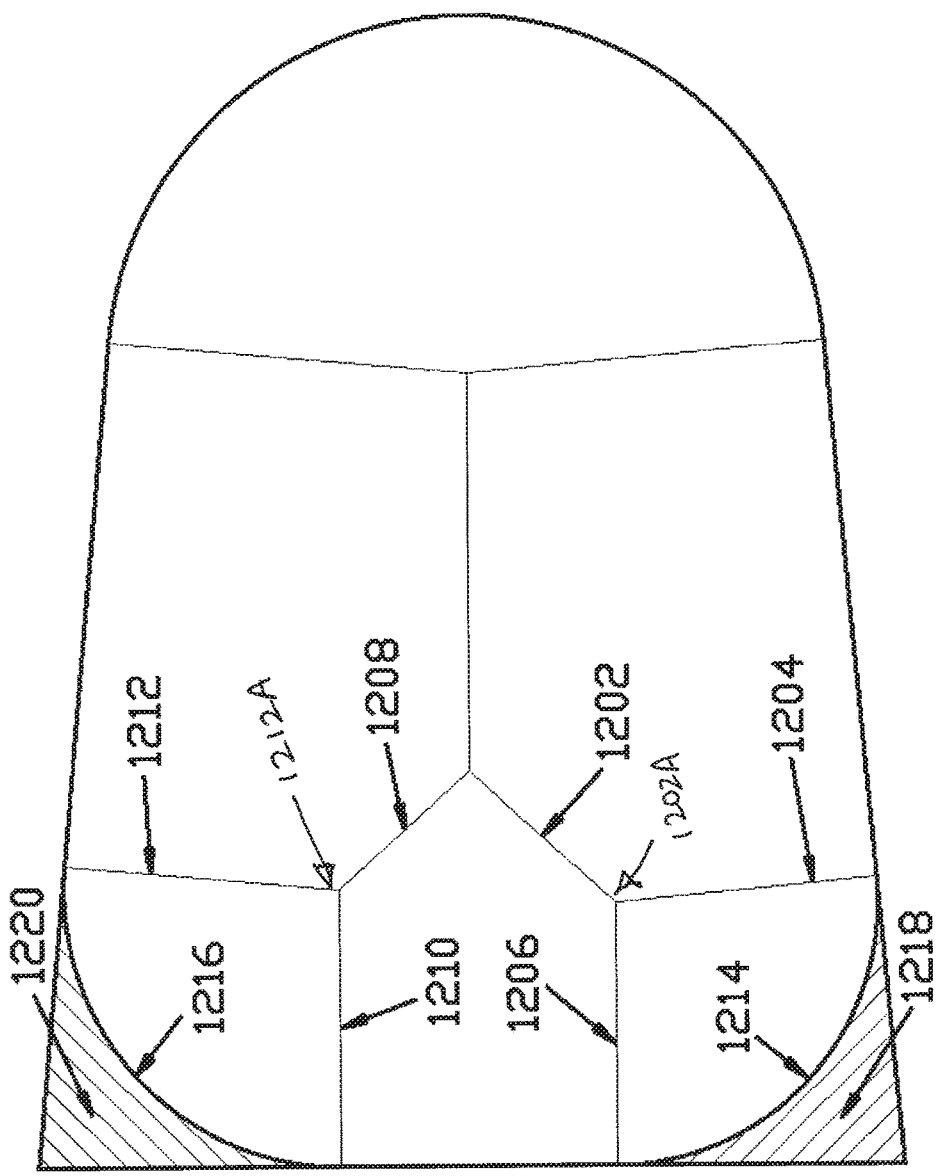
FIG. 12 is a plan-view diagram illustrating the trimming of a Voronoi Diagram in order to describe a subregion of a workpiece.

FIG. 12 illustrates the effect of shortening these edges. Edge 312 of FIG. 3 is replaced in FIG. 12 by a shorter edge 1202, and two new edges 1204 and 1206 are created by simply drawing two line segments at the new endpoint of 1202, 1202A, each one perpendicular to one of its associated boundary elements. Similarly, edge 310 of FIG. 3 is shortened to edge 1208, with line segments 1210 and 1212 added perpendicular to its associated boundary elements. To generate a tangent continuous subset of the workpiece, circular arcs 1214 (between segments 1206 and 1204) and 1216 (between segments 1212 and 1210) are added as well. The resulting subset covers the entire workpiece except for the hashed areas 1218 and 1220.

Considering a tangent continuous subset of the workpiece enables use of the first embodiment to cut the subset with a milling tool. In other words, as in the first embodiment, edges are added to the Voronoi Diagram of this tangent continuous subset to form a Modified Voronoi Diagram, and then the toolpath is created by traversing the Modified Voronoi Diagram. As in the first embodiment, instructions based on the toolpath are then used to drive a milling machine.

The remaining portions of the workpiece can be cut with other methods in the prior art, or by applying the described technology repeatedly. For example, the Voronoi Diagram can be trimmed as described above for some number of passes, then trimmed differently for the next few passes, and so on. Entire branches or subtrees of the Voronoi Diagram can be discarded to mill smaller sub-regions.

Figure 13:
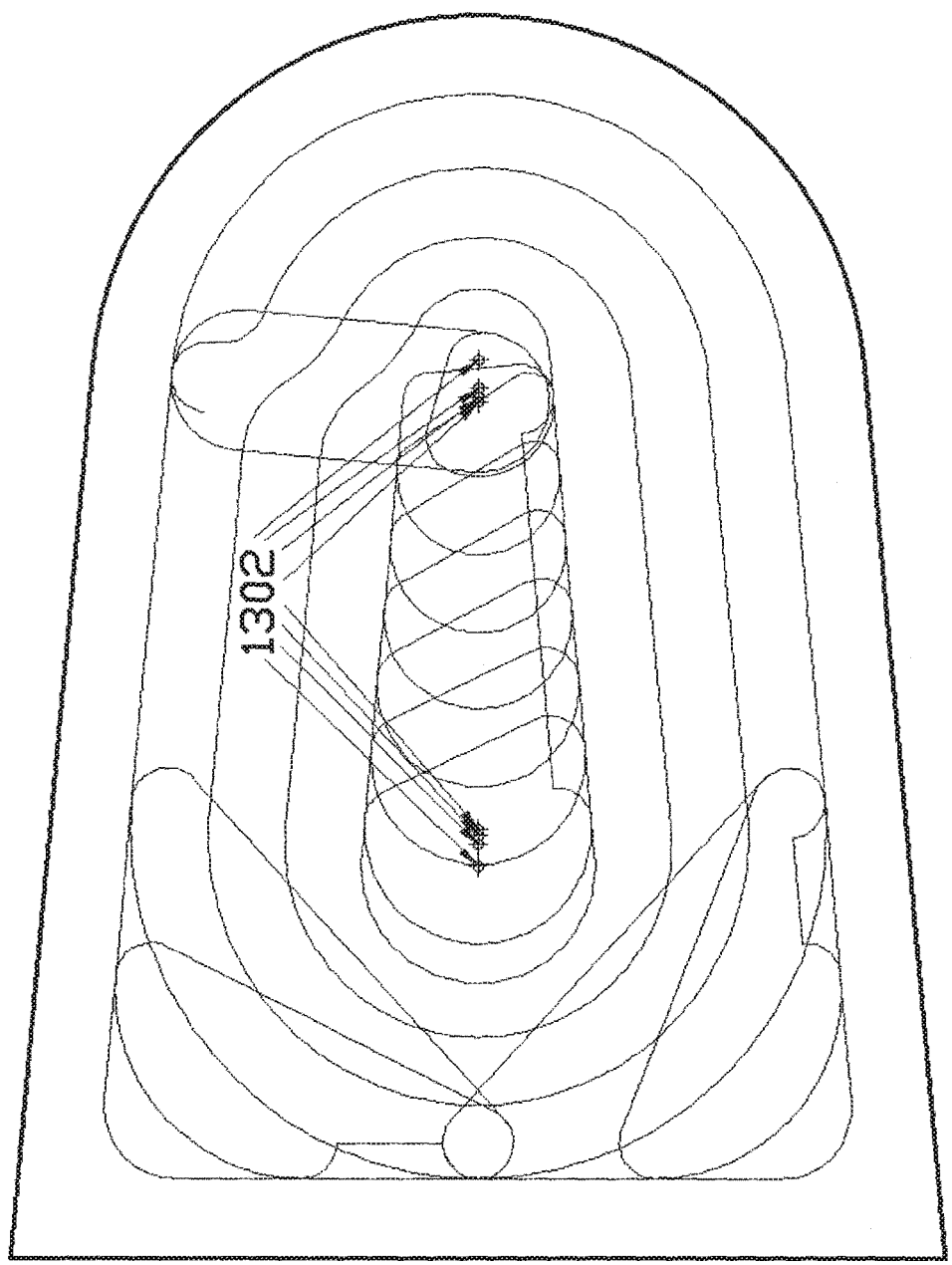
FIG. 13 is a plan-view diagram illustrating a toolpath for a workpiece constructed according to the teaching of the Second Embodiment.

FIG. 13 illustrates a complete toolpath for the workpiece of FIG. 3, which can be constructed using the method described in this second embodiment. The center of this workpiece can be cleared using a progression of evenly spaced circular arcs as described in the prior art, and then the described technology can be applied to a tangent continuous subregion. Note that the arcs from different passes all have different center points 1302 (e.g., non-concentric). Finally, evenly spaced arcs are used to mill out the upper and lower left corners of the workpiece.

Third Embodiment

The first and second embodiments rely on the Voronoi Diagram to generate non-concentric arc moves. However, the described technology does not require the use of the Voronoi Diagram. Consider a workpiece and a set of curves representing a toolpath inside the workpiece. Preferably, the curves are offsets of the boundary of the workpiece or of some subregion of the workpiece. Preferably, the workpiece is to be milled with a milling cutter of radius R.

This embodiment includes (1) receiving one or more chains of curves inside a workpiece representing a toolpath; (2) replacing at least one circular arc in the toolpath with a sequence of curves containing a circular arc closer to the boundary of the workpiece; and (3) outputting instructions based on the modified toolpath to control the operation of a milling machine.

This embodiment is applicable when a prior art toolpath generator is readily available and it is desirable to make modifications to an existing toolpath to reduce tool load and increase tool life. In such cases, it may be easy to generate a toolpath for a workpiece using a prior art toolpath generator. For example, the prior art toolpath generator could be used to create a sequence of parallel offsets of the boundary.

Assuming that such a toolpath is given, a method of this embodiment can first scan the toolpath for convex arc moves. When such an arc is encountered, it can potentially be replaced with a chain of curves closer to the boundary. In many cases, it will be undesirable to replace the arc. For example, if the arc lies on the final pass of the toolpath, it may be impossible to move it any closer to the boundary of the workpiece without gouging the part.

Figure 14:
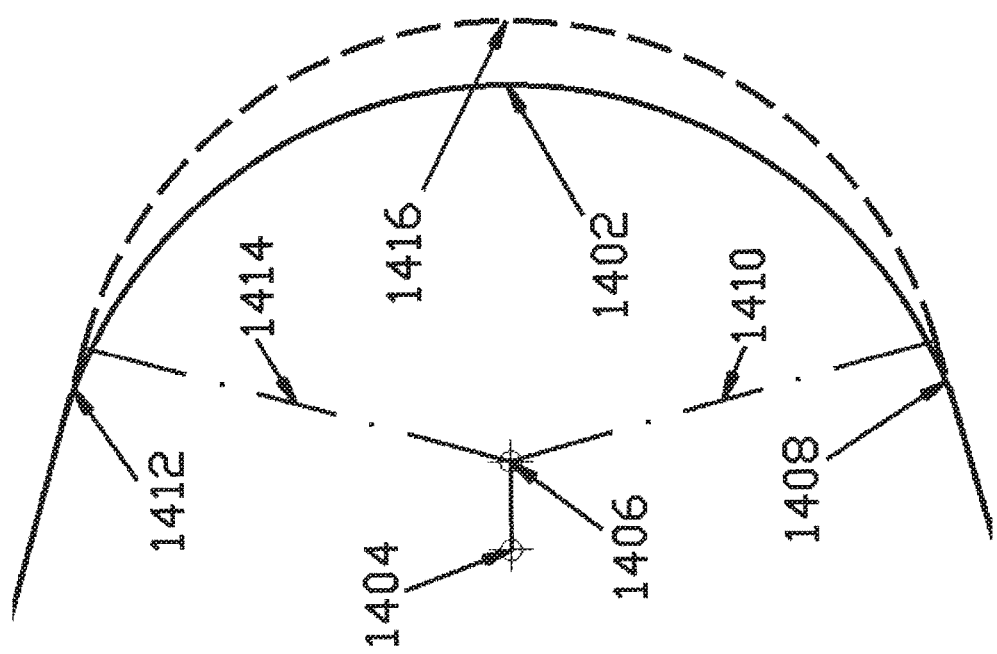
FIG. 14 is a plan-view diagram illustrating the replacement of an arc with a sequence of a line segment, an arc, and another line segment, according to the teaching of the Third Embodiment.
Figure 15:
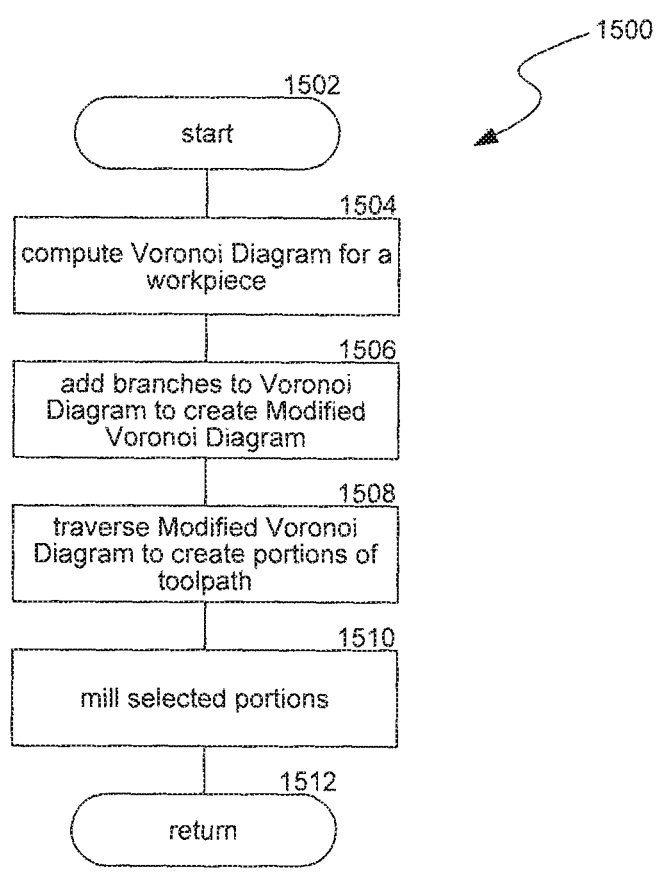
FIGS. 15 and 16 are flow diagrams illustrating routines invoked by the described technology in various embodiments.
Figure 16:
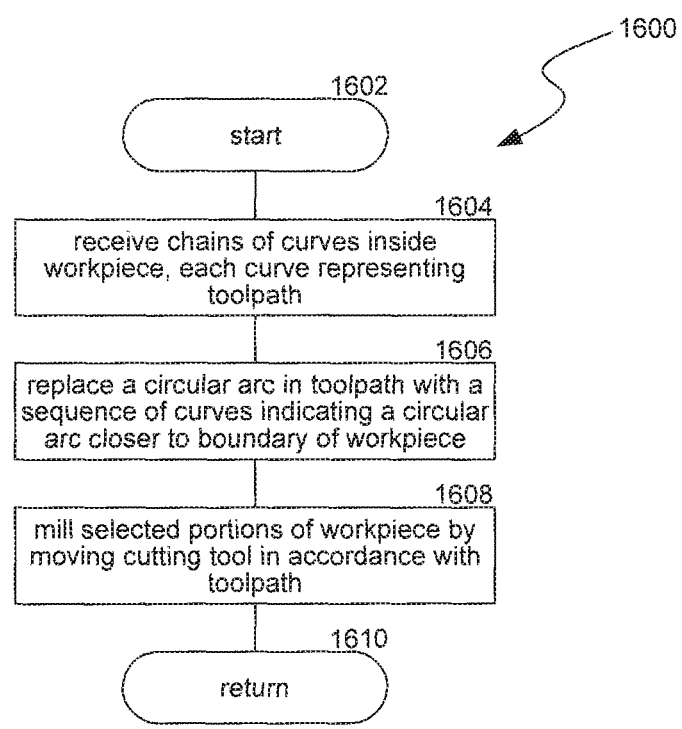

Referring now to FIG. 14, once an arc (e.g., arc 1402) is identified for replacement, a method this embodiment implements can draw a line from a center 1404 of the arc through the midpoint of the arc. Next, create a point 1406 some distance d towards the boundary of the workpiece, along the line just drawn. This value d can be computed using the same method described in the first embodiment, or some other technique.

The method can then draw a line segment 1408 tangent to the starting point of the arc, and draw a line 1410 perpendicular to this segment passing through the point 1406. The method can then draw the same construction tangent to the ending point of the arc, creating the tangent segment 1412 and perpendicular segment 1414. The method can then draw an arc tangent to these two lines, centered at 1406, discard the old arc 1402, and replace it with the sequence of three curves, 1408, 1416, and 1412.

Once all of the identified arcs have been replaced, instructions based on the modified toolpath may be used to drive a milling machine.

Aspects of the described technology involve machines including or interoperating with computing devices. The computing devices on which the described technology is implemented may include a central processing unit, memory, input devices (e.g., keyboard and pointing devices), output devices (e.g., display devices), and storage devices (e.g., disk drives). The memory and storage devices are computer-readable media that may be encoded with data structures and computer-executable instructions that implement the approval system, which means a computer-readable medium that contains the data structures and the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The described technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. As an example, various components or logic of the described technology may be distributed between a numerical control machine and a computing device that is communicably coupled to the numerical control machine, such as via a data communications network or other electronic or electromechnical interface.

Figure 17:
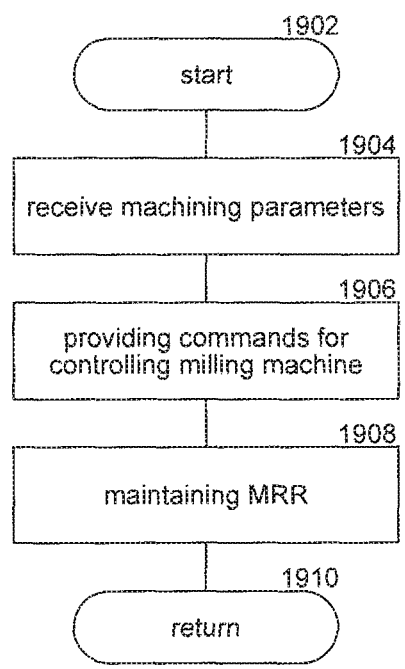
FIG. 17 is a flow diagram illustrating a routine invoked to create a toolpath in various embodiments.

FIG. 17 is a flow diagram illustrating a routine invoked to create a toolpath in various embodiments. The routine begins at block 1902. At block 1904, the routine receives machining parameters. As examples, the routine can receive spindle speed, ADOC, RDOC, and feedrate as parameters. At block 1906, the routine provides commands for controlling the milling machine based on the received parameters. As an example, the routine may provide commands to maintain MRR at block 1908 based on the received parameters. The routine returns at block 1910.

Figure 18:
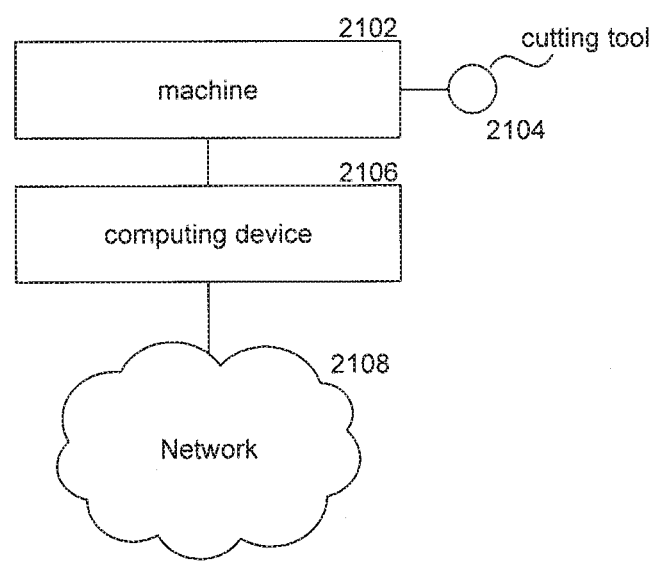
FIG. 18 is a block diagram illustrating components employed during machining in various embodiments.

FIG. 18 is a block diagram illustrating components employed during machining in various embodiments. The components can be implemented in hardware and/or software. The components can include a machine 2102, e.g., a milling machine. The machine can be associated with a cutting tool 2104. The machine may also be associated with a computing device 2106. The computing device may be communicably coupled with a network 2108, such as an intranet or the Internet. Other computing devices may be connected to the network (not illustrated). An operator (e.g., NC programmer) may use computing device 2106 or other computing devices to configure the machine 2102, such as by specifying various parameters. Alternatively, CAD/CAM systems may provide parameters to the machine. The CAD/CAM systems may operate on the computing device 2106 or another computing device.

In various embodiments, the table moves and the cutting tool is stationary. In various embodiments, the cutting tool moves and the table is stationary. In various embodiments, both the table and the cutting tool move.

In various embodiments, the described technology invokes various methods and employs components implemented in software and/or hardware.

Varied or Altered Aspects

Although the first and second embodiments use the Voronoi Diagram extensively, it is clear that other types of equidistantial sets could be used to achieve a similar result. For example, the Medial Axis (which is identical to the Voronoi Diagram when the workpiece boundary is a convex polygon) could easily be used instead. Other closely related sets such as the Cut Locus and the Symmetry Set of all bisectors could be used to achieve the same objective.

Although the figures show the creation of non-concentric arcs joined via line segments to the rest of the toolpath, this is not a requirement of the described technology. Any smooth or nearly smooth transition between the arc moves and the rest of the toolpath would serve just as well, whether these transitions were lines, arcs, splines, or other types of curves.

Although the third embodiment teaches the replacement of arcs with sequences of arcs and lines, it should be appreciated that it may well be desirable to first scan the toolpath for sharp corners and replace them with smooth arcs before applying the described technology.

From the foregoing, it will be appreciated that specific embodiments of the described technology have been described herein for purposes of illustration, but that various modifications may be made without deviating from the spirit and scope of the described technology. For example, method steps can be performed in various orders, include more or other steps, some steps can be removed, and so forth. Systems can include more or fewer components. The components can be implemented in software and/or hardware.

We claim:

1. A method for milling selected portions of a workpiece by a cutting tool of a numerical control machine, the numerical control machine having associated therewith a processor and a memory, the method comprising:
   receiving one or more chains of curves inside a workpiece representing a previously generated toolpath for milling selected portions of a workpiece;
   replacing at least one circular arc in the previously generated toolpath with a sequence of curves containing a new circular arc closer to the boundary of the workpiece to generate a revised toolpath; and
   milling the selected portions of the workpiece by moving the cutting tool in accordance with the revised toolpath.

2. The method of claim 1, wherein a center of the new circular arc lies on a predetermined line.

3. The method of claim 2, wherein the predetermined line connects the center of the replaced circular arc to a midpoint of the replaced circular arc.

4. The method of claim 1, wherein the previously generated toolpath has one or more passes, and a distance from a center of the replaced arc to a center of the new circular arc is determined by a process that results in inner passes of the revised toolpath being closer together than outer passes along at least one portion of the revised toolpath.

5. A non-transitory computer-readable storage device storing computer-executable instructions that, when executed, perform a method for milling selected portions of a workpiece by a cutting tool of a numerical control machine, the numerical control machine having associated therewith a processor and a memory, the method comprising:
   receiving one or more chains of curves inside a workpiece representing a previously generated toolpath for milling selected portions of a workpiece;
   replacing at least one circular arc in the toolpath with a sequence of curves containing a new circular arc closer to the boundary of the workpiece to generate a revised toolpath; and
   causing milling of the selected portions of the workpiece, wherein the milling includes moving the cutting tool in accordance with the revised toolpath.

6. The computer-readable storage device of claim 5, wherein a center of the new circular arc lies on a predetermined line.

7. The computer-readable storage device of claim 6, wherein the predetermined line connects the center of the replaced circular arc to a midpoint of the replaced circular arc.

8. The computer-readable storage device of claim 5, wherein the previously generated toolpath has one or more passes, and a distance from a center of the replaced arc to a center of the new circular arc is determined by a process that results in inner passes of the revised toolpath being closer together than outer passes along at least one portion of the revised toolpath.

9. A system for milling selected portions of a workpiece, comprising:
   a cutting tool associated with a numerical control machine;
   one or more processors associated with the numerical control machine, the one or more processors configured to:
      receive one or more chains of curves inside a workpiece representing a first toolpath for milling selected portions of a workpiece;
      replace at least one circular arc in the toolpath with a sequence of curves containing a new circular arc closer to the boundary of the workpiece to generate a second toolpath; and
      cause milling of the selected portions of the workpiece by moving the cutting tool in accordance with the second toolpath.

10. The system of claim 9, wherein a center of the new circular arc lies on a predetermined line.

11. The system of claim 10, wherein the predetermined line connects the center of the replaced circular arc to a midpoint of the replaced circular arc.

12. The system of claim 9, wherein the first toolpath has one or more passes, and a distance from a center of the replaced arc to a center of the new circular arc is determined by a process that results in inner passes of the second toolpath being closer together than outer passes along at least one portion of the second toolpath.

* * * * *

UNITED STATES PATENT AND TRADEMARK OFFICE
CERTIFICATE OF CORRECTION

PATENT NO. : 10,108,176 B2
APPLICATION NO. : 14/980391
DATED : October 23, 2018
INVENTOR(S) : Evan C. Sherbrooke et al.

Page 1 of 1

It is certified that error appears in the above-identified patent and that said Letters Patent is hereby corrected as shown below:

On the Title Page

On the page 2, in Column 2, item (56) under "Other Publications", Line 12, delete "M.," and insert -- et al., --, therefor.

In the Specification

In Column 8, Line 31, delete "electromechnical" and insert -- electromechanical --, therefor.

Signed and Sealed this
First Day of January, 2019

Andrei Iancu
*Director of the United States Patent and Trademark Office*